United States Patent [19]

Periasamy et al.

[11] Patent Number: 5,737,526

[45] Date of Patent: Apr. 7, 1998

[54] NETWORK HAVING AT LEAST TWO ROUTERS, EACH HAVING CONDITIONAL FILTER SO ONE OF TWO TRANSMITS GIVEN FRAME AND EACH TRANSMITS DIFFERENT FRAMES, PROVIDING CONNECTION TO A SUBNETWORK

[75] Inventors: Ravi Periasamy; Wayne Clark, both of Cary, N.C.; Gnanaprakasam Pandian, Sunnyvale; Ramin Naderi, San Jose, both of Calif.; Frank Bordonaro, Cary, N.C.; David Lowry, Pleasonton, Calif.

[73] Assignee: Cisco Systems, San Jose, Calif.

[21] Appl. No.: 366,713

[22] Filed: Dec. 30, 1994

[51] Int. Cl.[6] ................................................. G06F 13/00
[52] U.S. Cl. ................................................. 395/200.06
[58] Field of Search ........................ 395/200.02, 200.03, 395/200.1, 200.2; 370/16, 94.3; 364/940, 990.92, 990.61, 990.64, 990.67

[56] References Cited

U.S. PATENT DOCUMENTS

| | | | |
|---|---|---|---|
| 4,644,496 | 2/1987 | Andrews | 395/800 |
| 4,692,918 | 9/1987 | Elliott et al. | 370/401 |
| 4,701,756 | 10/1987 | Burr | 340/825.02 |
| 4,887,259 | 12/1989 | Morita | 370/60 |
| 5,016,244 | 5/1991 | Massey, Jr. et al. | 370/217 |
| 5,018,133 | 5/1991 | Tsukakoshi et al. | 370/256 |
| 5,018,137 | 5/1991 | Backes et al. | 370/85.13 |
| 5,214,646 | 5/1993 | Yacoby | 370/402 |
| 5,218,600 | 6/1993 | Schenkyer et al. | 370/217 |
| 5,241,682 | 8/1993 | Bryant et al. | 395/800 |
| 5,251,205 | 10/1993 | Callon et al. | 370/60 |
| 5,261,256 | 11/1993 | Doeringer et al. | 370/60 |
| 5,313,465 | 5/1994 | Perlman et al. | 370/85.13 |
| 5,325,362 | 6/1994 | Aziz | 370/94.3 |
| 5,363,489 | 11/1994 | Snyder | 395/275 |
| 5,365,523 | 11/1994 | Derby et al. | 370/85.2 |
| 5,371,852 | 12/1994 | Attanasio et al. | 395/200.02 |
| 5,423,002 | 6/1995 | Hart | 395/200 |
| 5,471,580 | 11/1995 | Fujiwara et al. | 395/200.02 |
| 5,473,599 | 12/1995 | Li et al. | 370/16 |
| 5,557,745 | 9/1996 | Perlman et al. | 395/200.02 |

OTHER PUBLICATIONS

Black, Uyless, "TCP/IP and Related Protocols", McGraw–Hill Series on Computer Communications, 1992, pp. 225–249.

"Configuring Boundary Routing System Architecture", Chapter 15, NETBuilder Family Bridge/Router Operation Guide, Mar. 1994, pp. 26–29.

*Primary Examiner*—Thomas C. Lee
*Assistant Examiner*—Anderson I. Chen
*Attorney, Agent, or Firm*—Burns, Doane, Swecker & Mathis LLP

[57] ABSTRACT

A hierarchical wide-area network architecture which conforms to the DLSw protocol is provided, in which multiple routers having a logical connection to one another are designated as a peer group. At least one router in each peer group is designated as a border peer, and functions as a gateway between the members of its group and other peer groups. The peer group structure reduces broadcast traffic on slow links by changing the source of the broadcast from a small access router with a relatively slow link to another, more powerful router, with a faster link on the network. More than one border peer can be included in each group, to share the transmission workload and act as a backup. The border peers can share information about the groups that they service and can cooperate to provide a single-point broadcast service to all of the users of the service. When two or more routers are connected to a network in parallel to provide back-up facilities, conditional filters are employed to prevent redundant operations. Different types of frames are handled by the two different routers, so that they share the communication load between them and make the most effective use of the available bandwidth.

8 Claims, 2 Drawing Sheets

NETWORK HAVING AT LEAST TWO ROUTERS, EACH HAVING CONDITIONAL FILTER SO ONE OF TWO TRANSMITS GIVEN FRAME AND EACH TRANSMITS DIFFERENT FRAMES, PROVIDING CONNECTION TO A SUBNETWORK

FIELD OF THE INVENTION

The present invention is directed to computer networks, and more particularly to an architecture for connecting several subnetworks to one another.

BACKGROUND OF THE INVENTION

When two or more computers need to communicate with one another, they are typically connected to one another by a network. Each computer that is connected to the network is referred to as a node, or station. Networks can be classified according to the distances which separate the various nodes. A local-area network, or LAN, typically comprises nodes that are connected within a relatively small geographic area, such as within an office, a floor, or a building. If the nodes are separated by larger distances, for example they are in different buildings, different cities or different countries, the network which interconnects them is referred to as a wide-area network, or WAN. A WAN can comprise several LANs, each of which forms a subnetwork in the overall wide-area network. Because of the larger distances involved, WANs usually include bridges and/or routers, which connect groups of nodes, e.g. LANs, by means of telephone lines or other existing communications lines. As a result, the available bandwidth for a WAN may be significantly less than that for an individual LAN.

The different effective operating speeds of LANs and WANs can present some problems with respect to some network communications protocols. For example, one protocol that was developed for communicating over LANs is known as the Systems Network Architecture, or SNA. This protocol has certain timing constraints that must be adhered to for proper communications. For example, if a source node on a network transmits data to a destination node, it expects to receive an acknowledgment or other type of response from the destination node within a certain period of time. If no response is received within that time, the network and/or the destination node can be interpreted to be faulty, and the communications session between the two nodes may be shut down. While the timing constraints of the SNA protocol can be easily accommodated in a high speed LAN, the longer distances and the slower speeds encountered in a WAN may delay the transmission of the response for a sufficient period of time that it is not received at the source node within the required time window. As a result, a fault condition may be indicated, when no fault may actually exist.

To overcome this problem, a protocol known as Data Link Switching (DLSw) was developed. Under this protocol, when a source node on one LAN sends a communication to a destination node on another LAN, a router associated with the source node reformats the information from the source node in accordance with a different protocol that is appropriate for communications over WANs, such as the Transmission Control Protocol (TCP), and sends it over the network. At the receiving end, another router reformats the information in accordance with the SNA protocol, and forwards it on to the destination node. The router at the source end of the network impersonates the destination node, in response to data sent by the source node. For example, the router may send an acknowledgment for each frame sent by the source node. As a result, the source node operates as if it were communicating directly with the destination node. Since this router is typically located close to the source node, the responses will be received within the proper amount of time, and therefore no fault condition is indicated.

In a conventional network that is configured according to the DLSw protocol, every router in the network has a logical one-to-one connection with every other router. Each router stores information relating to each of the other routers to which it can be logically connected. Depending upon the capabilities of the routers and the speeds of the transmission links over which they communicate, a network which implements the DLSw protocol is typically limited to a maximum of approximately 50 routers. As sources of information grow in number and geographic disparity, this limitation of approximately 50 routers per network can impose significant constraints. For example, as a multi-national corporation expands its branch and regional offices around the world, larger networks are required to interconnect all of the offices. Accordingly, it is desirable to provide a network architecture in which the potential number of routers can be significantly greater than 50.

In addition to hardware limitations, another problem that increases in magnitude as the sizes of networks grow is that of traffic congestion, particularly explorer traffic. When a source node desires to send a message to a destination node, it may not always know the proper path over which to communicate with the destination node. In such a case, the source node first broadcasts an explorer frame to each of the routers connected to its network. In essence, the explorer frame inquires which routers can connect to the destination node. In response, the router associated with the source node sends out appropriate inquiries to all of the other routers to which it is connected, to determine which ones have access to the destination node. In a network where each router is connected to fifty other routers, the originating router must send 50 copies of the explorer frame, each of which is addressed to a different one of the other routers. The responses of these routers to the explorer frame can generate a considerable amount of traffic on the WAN. Accordingly, it is desirable to provide a network architecture which localizes broadcast frames, and thereby reduces the amount of explorer traffic in the wide-area network.

BRIEF STATEMENT OF THE INVENTION

In accordance with the present invention, these objectives are met by means of a hierarchical wide-area network architecture which conforms to the DLSw protocol, in which multiple routers having a logical connection to one another are designated as a peer group. At least one router in each peer group is designated as a border peer, and functions as a gateway between the members of its group and other peer groups. With this arrangement, a peer group can have up to 50 routers, and only the border peer is required to contain information about, and provide a connection to, the rest of the network. To provide this function, the border peer can be a more powerful one that is linked to other routers in its peer group through a relatively fast communications link. With this architecture, the network can accommodate 2,500 or more routers.

The peer group structure can also be used to reduce broadcast traffic on slow links. This is done by changing the source of the broadcast from a small router with a relatively slow link to the more powerful border peer, with a faster link on the network. One or more of these faster routers can be used to advertise group broadcast services. The smaller routers that need to broadcast traffic to all of the routers in the group can use the services of these faster routers.

In an alternative embodiment of the invention, more than one border peer can be included in each group, to share the transmission workload and act as a backup. Each of the two or more border peers can contain information regarding the other border peers, which need not be known to the other routers that use the broadcast services. The border peers can share information about the groups that they service and can cooperate to provide a single-point broadcast service to all of the users of the service. For broadcast traffic within a peer group, the two border peers can share the load among themselves.

In another aspect of the invention, when two or more routers are connected to a network in parallel to provide back-up facilities, conditional filters are employed to prevent redundant operations that make inefficient use of the available bandwidth. When both of the routers are operating, the conditional filters cause one of the routers to drop selected network frames, which are handled by the other router, and thereby avoid duplicate frames. Preferably, different types of frames are handled by the two different routers, so that they share the communication load between them and make the most effective use of the available bandwidth. If one of the two routers goes down, i.e. becomes non-operational, the other router handles all of the traffic to and from the network.

Further features of the invention, as well as the advantages offered thereby, are explained in detail hereinafter with reference to exemplary embodiments illustrated in the accompanying drawings.

DETAILED DESCRIPTION

To facilitate an understanding of the principles which underlie the present invention, as well as the practical applications thereof, the invention is described hereinafter in connection with certain specific embodiments. For example, reference is made to particular network protocols. It will be appreciated, however, that the applications of the invention are not limited to networks which employ only these protocols. Rather, the invention will find utility in any network in which it is desirable to increase the size of the network beyond limitations imposed by hardware specifications and/ or to reduce traffic congestion.

Figure 1:
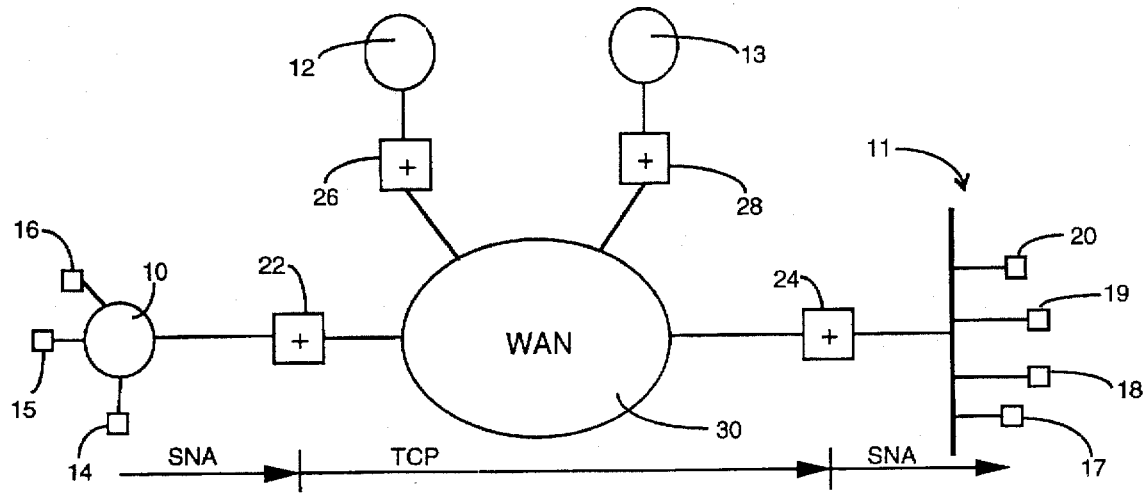
FIG. 1 is an architectural diagram of a conventional wide-area network which operates in accordance with the DLSw protocol.

Referring now to FIG. 1, the architecture of a typical wide-area network based upon the DLSw protocol is shown. The wide-area network comprises a number of subnetworks, such as the local-area networks 10, 11, 12 and 13. Each local-area network is made up of two or more computers that are connected via a suitable configuration. For example, LAN 10 might comprise a number of computers 14, 15, 16 which are connected to one another via a token ring. Another network 11 might consist of a number of computers 17–20 which are connected via a bus, or an Ethernet connection. Each of the computers 14–20 forms a node on the network. Each of the local-area networks 10–13 has a router 22–28 associated with it. The various routers are connected by means of links which form the wide-area network 30. These links might be telephone lines, for example, or other dedicated lines. In essence, the wide-area network 30 logically connects each of the routers to every other router in the network. With this arrangement, any given node in the network can communicate with any other node.

In operation, the computers within a given local-area network communicate with one another by means of a specified protocol. For example, the computers in the local-area networks 10 and 11 may each use the SNA protocol to communicate with the other computers in their given network. If a source computer 14 in one LAN 10 desires to communicate with a destination computer 17 in another LAN 11, the source computer sends a frame of data to its associated router 22. This router identifies a destination router, in this case the router 24. As described previously, an SNA-protocol frame is not adapted for transmission over a wide-area network. Accordingly, in accordance with the DLSw protocol, the SNA frame of data is reformatted in the router 22 for transmission over the wide-area network 30. For example, the frame of data can be reformatted in accordance with the TCP protocol. The frame is then transmitted from the router 22 to the router 24 using this protocol. At the router 24, the received frame of data is reformatted according to the SNA protocol, and then forwarded to the destination computer 17.

In an architecture which conforms to the DLSw protocol, of the type shown in FIG. 1, there is a practical limit on the number of routers that can be connected to each other via the wide-area network. For a typical router, that number is approximately fifty. Of course, it is possible to increase the total number of routers by using larger, more powerful routers. However, the cost of these more powerful routers can make the network expansion prohibitively expensive.

Figure 2:
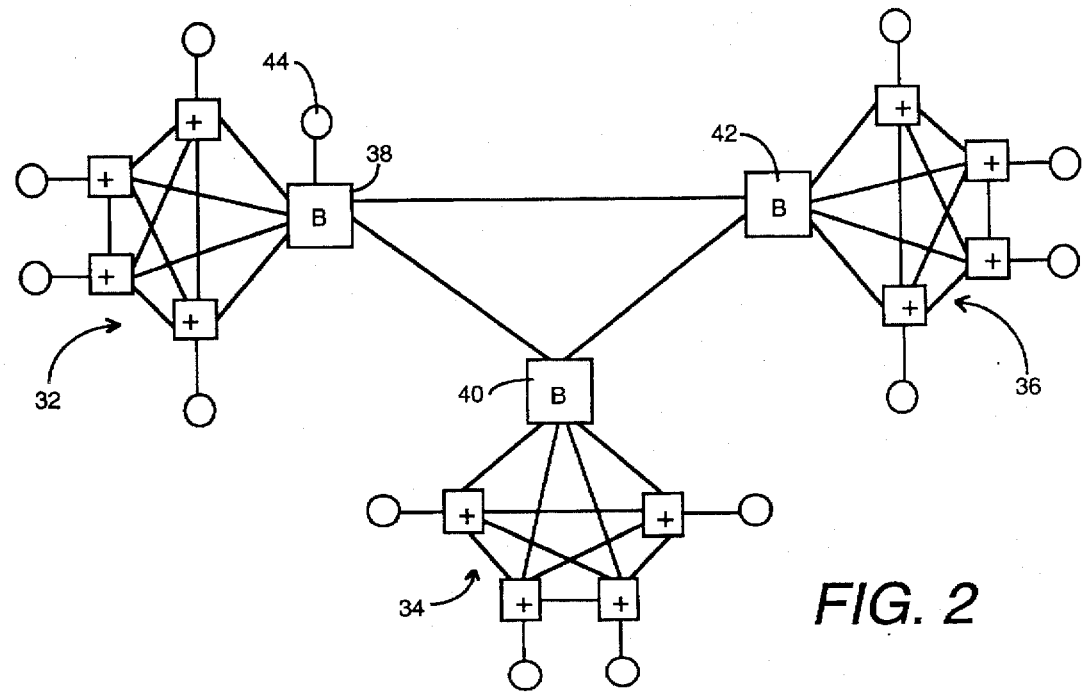
FIG. 2 is an architectural diagram of one embodiment of a wide-area network in accordance with the present invention.

In accordance with the present invention, a network which conforms to the DLSw protocol can be expanded to employ a larger number of routers without requiring that every router be made more powerful. This is accomplished by means of a hierarchical peer group architecture. Referring to FIG. 2, multiple routers that have a logical connection to one another, and which are expected to participate in data traffic between each other, are designated as a peer group. In the example shown in FIG. 2, three peer groups 32, 34 and 36 are shown. Associated with each peer group of routers is a border peer 38, 40 or 42, which can be a more powerful router than the other routers of the group. The border peer acts as a gateway to other peer groups. Preferably, each group consists of a number of routers that have a logical connection to one another. For example in a large corporation having a number of regional offices, each of which is responsible for multiple branch offices, the peer groups can be respectively associated with the regional offices. Thus, each of the routers in the group can be respectively associated with the branch offices, and the border peer for that group can be associated with the regional office responsible for those branch offices.

Each of the routers in a group communicates with one another through a logical, although not necessarily direct, connection. Therefore, every router knows about each of the other routers in its group. However, they do not know about the routers in any other group. Consequently, a single group can accommodate up to 50 routers itself, since this is the maximum number of routers that each of its members must know about. Group-to-group communications are handled via the border peer within the respective groups. Thus, only the border peer for a group needs to have information about, and connectability to, the rest of the wide-area network. Since the border peer has a greater number of connections, it is preferably a more powerful router. For example, each border peer may have the ability to connect to 100 other routers. Consequently, there can be up to 50 border peers connected to one another, and each peer group can include up to 50 routers. As a result, the network architecture can accommodate up to 2,500 total routers.

In operation, all of the routers in a group are peers of one another, wherein each router can communicate directly with any other router in the group, including the border peer. All of the border peers are also at a peer level with one another, i.e., there is a logical connection from each border peer to every other border peer. Whenever a router in one group desires to communicate with a router in a different group, the communications are conducted through the border peers of each of the two groups. In this type of operation, the border peers function as relay devices. In other words, the border peers do not reformat the frames of data received from the other routers of their group. Rather, this data is merely passed along, or relayed, to the other border peer. If needed, the border peer can add a relay header to each frame of data that it passes along to another border peer. At the receiving border peer, the frame of data is relayed to the destination router in its group.

Of course, each border peer can also have an associated local-area network. In the example of FIG. 2, the border peer 38 is connected to a LAN 44. When one of the nodes in the LAN 44 desires to communicate with a node associated with a different group, the border peer 38 can operate in the normal fashion, to reformat the data from its LAN, as required, and route it to the border peer associated with the destination node. If that destination node is located on a LAN connected to the border peer, that router can reformat the data frame in accordance with the network protocol for its LAN, and then forward it to the destination node. Otherwise, the receiving border peer functions to relay the data frame to the group router associated with the destination node.

In addition to increasing the available number of routers in the wide-area network, the hierarchical group architecture of FIG. 2 can also be used to reduce congestion due to broadcast traffic. For example, the individual routers of a group might typically be connected to one another by a relatively slow link, e.g., one which might have a bandwidth of 56 kbps. However, in the implementation of the present invention, the more powerful border peer can be connected to the other routers in its peer group through a faster link, e.g., a T1 carrier having a bandwidth of 1.5 Mbps. When a router within a group needs to broadcast information to the other routers of the group, it sends the broadcast information to the border peer. The border peer then broadcasts the information to all of the routers in the group, or a subset of the group, using the faster link. With this approach, the broadcast is localized to the routers within the group, rather than all routers in the network.

In addition to providing faster broadcast services, this arrangement also reduces the number of wide-area network protocol sessions that are required on the slower links. More particularly, if the wide-area network comprises a total of 2,500 routers, the originating router is not required to conduct 2,500 separate protocol sessions with each of the other routers. Rather, the originating router need only send the broadcast frame to its border peer. If the border peer knows the location of the destination node, it can send the frame directly to that node. Otherwise, it can copy the frame and send it to all of the routers within the group, as described previously. If the destination node is associated with a different group, the border peer for the originating router can send a copy of the broadcast frame to the other border peers as well, which can then forward the frame to the destination node, if known, or broadcast it to all routers within the group. As a result of this arrangement, the point of the broadcast is the border peer, rather than the source node, thereby reducing broadcast traffic over the network.

Figure 3:
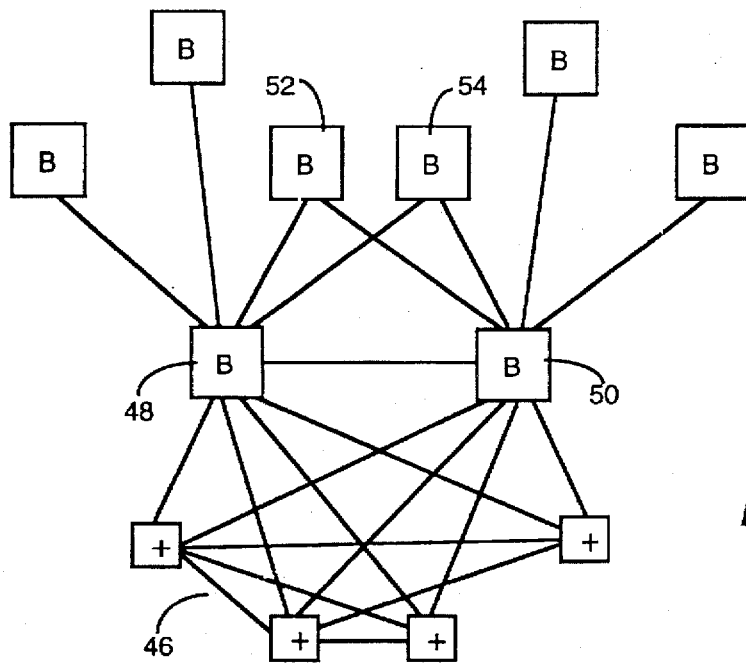
FIG. 3 is an architectural diagram of an alternate embodiment of the invention, in which two border peers are associated with a group.

In the embodiment of FIG. 2, only one border peer is associated with each peer group. However, it is possible to utilize two or more border peers per group. In such a case, the multiple routers can share the traffic load and function as backups for one another. Such an arrangement is illustrated in FIG. 3. Referring thereto, a peer group 46 has two border peers 48 and 50 associated with it. Each of these two border peers are connected with other border peers in the network. It can be seen, however, that each of the two border peers 48 and 50 are not connected to the same border peers. Rather, each border peer of the group is connected with a subset of the other group's border peers. In the specific example of FIG. 3, the two border peers 48 and 50 of the group 46 are both connected to other border peers 52 and 54 in the network. The remaining border peers in the network, however, are only connected to one or the other of the two border peers 48 and 50.

In operation, a source router within the group 46 can choose either of the two border peers 48 or 50 to broadcast information over the network. The particular border peer that is chosen can be picked arbitrarily, for example. Alternatively, the selection of the border peer can be made on the basis of cost information associated with each router. For example, the source router may determine which of the two border peers provides a faster connection, i.e., which one is connected to the source node by a faster link. If that router is available, it is chosen. If, however, much of its capacity is currently being used, it can transfer the handling of the communications with the source node to the other border peer.

The two border peers can also cooperate with one another to provide one-point broadcast service. In particular, a source router may send a frame to one of the two border peers, e.g. the router 48, to be broadcast over the network. The border peer 48 that receives this frame can send it to all of the other border peers to which it is connected. This frame is also sent to the other border peer 50, which has information regarding the groups to which the first border peer 48 has access, i.e. routers 52 and 54 in the example of FIG. 3. The border peer 50 broadcasts the frame only to those other border peers associated with groups to which the first border 48 router does not have access.

Figure 4:
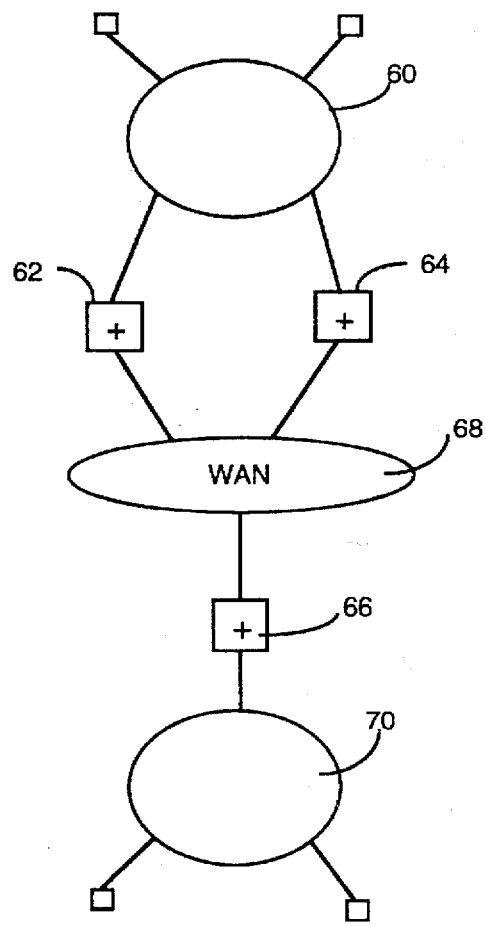
FIG. 4 is an architectural diagram of a wide-area network in which two routers are connected to a network.

In the embodiment of FIG. 3, two routers are effectively connected to the same network, via one of the group routers. In the past, it has been known to connect two routers to the same network for backup purposes. An implementation which employs such an architecture is illustrated in FIG. 4. Referring thereto, a local-area network 60 is connected to two routers 62, 64 in parallel. These two routers are connected to another router 66 via a wide-area network 68. The router 66 is connected to a second local-area network 70. In operation, if one of the routers 62 or 64 goes out of service, the other router handles the network traffic. In order for the two routers to function as backups for one another, both routers have to run in parallel, which results in a needless waste of available bandwidth. Alternatively, the routers have to be physically powered on and off.

In accordance with another feature of the present invention, the available bandwidth provided by the two routers can be more effectively utilized, and the need to physically turn the routers on and off can be avoided, through the use of conditional filters. More particularly, each of the routers 62, 64 and 68 is provided with conditional information that determines the path to be taken when a frame is transmitted between the two LANs 60 and 70. One conditional filter is provided in the software which controls the router 68, for the condition in which a frame is transmitted from the LAN 70 the LAN 60. Generally, the router 68 determines if one of the two parallel routers 62 and 64 is operational. For example, the router 60 may check to see whether the router 62 is operating. If so, all frames that are to be transmitted to the LAN 60 are sent to the router 62, and filtered from the router 64.

As an extension of this feature, different types of filtering can be carried out with respect to different types of information, to more effectively distribute the workload between the two routers 62 and 64. If the router 68 determines that both of the routers 62 and 64 are operational, it can send all information of one type through the router 62, and information of another type through the router 64. For example, all frames which comply with the SNA protocol can be sent to the router 62, whereas all frames conforming to a different protocol, e.g., NetBIOS, can be sent to the router 64, for transmission to the LAN 60. If the router 68 detects that either of the two routers 62 and 64 is out of service, all traffic can be sent to the other router.

A second filter is employed for information which originates in the LAN 60 and is sent to the LAN 70. In a normal operation, two copies of the same frame would be sent to the LAN 70, which are respectively transmitted through the router 62 and 64. In accordance with the present invention, however, one of the two routers can determine whether the other is operational. For example, the router 62 can regularly send a message to the router 64, to determine whether it is up and running. If so, the router 62 can drop all frames of information from the LAN 60 to the LAN 70, so that those flames are only transmitted through the router 64. Again, the conditional filter can be employed to balance the workload between the two routers. For example, the router 62 can transmit all SNA-protocol frames and drop all NetBIOS-protocol frames, whereas the router 64 can filter out all SNA frames while forwarding NetBIOS frames.

With this approach, redundant transmissions through parallel routers are avoided, and the traffic load is balanced among the various routers. However, the network maintains the ability to fall back automatically to one router if the other becomes non-functional.

It will be appreciated that the conditional filtering described with reference to FIG. 4 is not limited in application to the hierarchical peer group architecture of FIG. 3. Rather, this filtering technique can be employed in any network architecture in which two routers are physically and/or logically connected to the same network.

Preferably, the network user determines the conditions for the filters that operate in each of the routers. For example, the user can be provided with the ability to select which types of frames are to be handled by the respective routers. Alternatively, the routers themselves can automatically make such a determination. For example, if one router is connected to the network by a faster link than the other router, it may be selected as the default router for all transmissions. In that case, the filter of the slower router is set to drop all frames transmitted to it by the shared network. Once the faster router reaches a particular utilization level, however, it can instruct the slower router to begin to handle certain types of frames, e.g., all frames which conform to a designated protocol. The slower router then handles these frames, and the filter in the faster router is set to drop them, until such time as network utilization decreases below a threshold level.

From the foregoing, therefore, it can be seen that the present invention provides a network architecture that overcomes the size limitations previously associated with DLSw protocols. By grouping routers in a logical manner that is related to the expected communication loads among them, traffic within a group can be handled more efficiently. Furthermore, the point of a broadcast message is shifted from a source node to a router, so that congestion on the network is reduced. In addition, the use of conditional filters makes more effective use of available bandwidth when two or more routers are connected to a network without losing the ability to have one router function as a backup for the other.

The foregoing description of embodiments of the invention has been made with reference to the Data Link Switching architecture for a wide-area network. It should be noted that the term Data Link Switching is not intended to refer only to networks which conform to network industry standards known by that name. Rather, the term Data Link Switching, as used in the context of the present invention, includes networks which implement industry standards, as well as derivatives and extensions of the Data Link Switching protocol that permit data formatted according to a local area network protocol to be transmitted over a wide area network.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A wide-area network, comprising:
    a plurality of subnetworks, wherein each subnetwork contains at least one network node;
    a plurality of routers that are respectively connected to said plurality of subnetworks, for providing a logical connection from a node in one subnetwork to a node in another subnetwork, and wherein at least one of said subnetworks has at least two routers connected to it in parallel; and
    a conditional filter in each of said two routers that are connected to said one subnetwork, said conditional filter causing said routers to selectively transmit or drop frames of data that are sent to said routers from said one subnetwork in parallel, so that only one of said two routers transmits a given frame of data from one subnetwork and each of said two routers transmits different respective frames of data from said one subnetwork.

2. The wide-area network of claim 1 wherein the conditional filter in one of said two routers causes said router to transmit frames of a first type and to drop frames of a second type, and the conditional filter in the other of said two routers causes said other router to drop frames of said first type and to transmit flames of said second type.

3. The wide-area network of claim 2 wherein said first and second types of frames respectively relate to different network transmission protocols.

4. The wide-area network of claim 1 further including means in each of said two routers for determining the operational state of the other router, and for interrupting the function of the conditional filter if the other router is determined to be non-operational, such that all frames of data from said one subnetwork are transmitted by the operational router.

5. The wide-area network of claim 1 further including means in the other routers of said wide-area network for selecting one of said two routers for conducting communications with said one subnetwork.

6. The wide-area network of claim 5 wherein said selection is made on an arbitrary basis.

7. The wide-area network of claim 5 wherein said selection is made on the basis of the cost of communicating with each of said two routers.

8. The wide-area network of claim 1, wherein said network conforms to the Data Link Switching protocol.

* * * * *